Patented Aug. 19, 1952

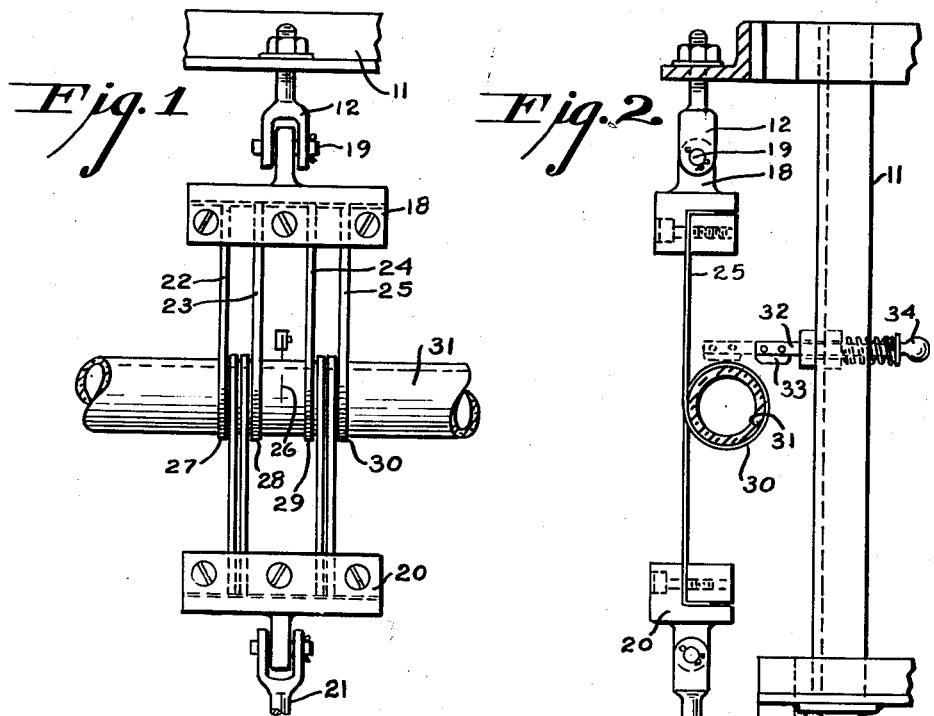

2,607,169

UNITED STATES PATENT OFFICE 2,607,169

GLASS SEVERING METHOD AND APPARATUS

Robert B. Randels, Corning, N. Y., assignor to Corning Glass Works, Corning, N. Y., a corporation of New York Application March 22, 1948, Serial No. 16,255

9 Claims. (Cl. 49—48)

The present invention relates to methods of and apparatus for serving compressible bodies of frangible material, such, for example, as ceramics and the like, and is particularly concerned with the provision of methods and facilities suitable for severing tubular glass bodies.

It is common practice to sever a tubular glass body by thermal shock or by abrading a surface thereof and applying a bending force to complete the severance. Severing tubes in the foregoing fashion may be done rapidly, but the ends are uneven and usually require subsequent precison trimming.

The prime objects of the present invention are tube-severing methods which effect severance not only with rapidity, but also with a degree of accuracy making a subsequent trimming operation unnecessary.

Other objects are improved wholly mechanical tube-severing methods.

Still further objects are simple forms of apparatus by means of which the foregoing methods may be readily carried out.

The foregoing methods involve introducing into a compressible body a localized, radial, compressive force or load over a circumferential area to create a circumferential band of maximum axial tension along a desired line of severance. Fracture of the body can then be initiated by abrading it along a portion of this line. If the initially applied load is insufficient to create fractue when abrasion occurs, the fracture can be brought about after abrasion by increasing the load.

The mechanical means for carrying out the present invention may take the form of one or more clamping loops composed of wires, ribbons, or bands of metal or the like. Such clamping means in introducing peripheral compressive forces into the body set up tensional axial stresses in the bore wall surface thereunder and in the laterally adjacent outer surfaces of the body which may be abraded to initiate fracture along a desired line of severance.

To promote fracture the glass should accordingly be scored along a line of maximum axial tension. Scoring may be carried out either before or after placing an article under compressive forces. Scoring the article after introduction of compressive forces, however, is effective at somewhat lower loads than when scoring precedes the introduction of such loads. Preferably, the article is placed under a preliminary compressive force or load, scored to initiate fracture, and then complete fracture produced by increasing the compressive force. Whether a tubular article is scored on its inner or outer surface is wholly a matter of choice or convenience, dictated for the most part by the design of the apparatus and/or the bore diameter of the article.

The accompanying drawing illustrates simple forms of structures embodying the invention by means of which applicant's methods may be carried out.

In the drawing,

Fig. 1 is a front elevation of an apparatus embodying the invention, by means of which applicant's method may be practiced, with a lower portion broken away and with a piece of tubing held therein preparatory to its severance.

Fig. 2 is a side elevation of the complete apparatus of Fig. 1.

Fig. 2a is a longitudinal sectional elevation of the tubing and of a part of the apparatus of Figs. 1 and 2, a portion of the tubing being somewhat distorted for emphasis.

Fig. 3 is a side elevation of a modified form of apparatus having a piece of tubing clamped therein.

Fig. 4 is a view of a fragment of Fig. 3 as seen when looking in the direction of arrows 4—4 in Fig. 3.

Referring to the drawing in detail, the structure of Figs. 1 and 2 includes a frame 11 from the upper end of which depends a clevis 12. Frame 11 at its lower end has a depending link 13 connected thereto by a pivot pin 15. Link 13 at its lower end is pivotally connected by a pin 16 to one end of a lever 17 held in a substantially horizontal plane by apparatus extending between lever 17 and clevis 12. This apparatus comprises a clamp 18 pivoted to clevis 12 by a pin 19, and a clamp 20 pivotally connected to a link 21 in turn pivotally connected to lever 17. Metal strips 22—25 of clock spring material or the like are formed into loops or bands 27—30 intermediate their ends, adapted to receive a glass tube 31 to be severed. Strips 22—25 at their ends are anchored to clamps 18 and 20 respectively. Lever 17 is provided with a weight W adjustable thereon to tighten loops 27—30 about tube 31 to create therein the desired degree of highly localized circumferential compressive force or load required in the severing operation. The vertical run of frame 11 has a plunger 32 passing therethru, which carries an abrasive knife 33 adapted to be passed over tube 31 to score the same by depressing a button 34.

In the structure of Figs. 3 and 4, a spring clamp 40 is arranged about the tube 31 and compressed thereabout to create the desired degree of highly localized peripheral compressive force or load therein, as by a vise 41 having the usual handle 42. Scoring is most readily accomplished, in this case, on the inner surface of the tube.

*Operation*

In carrying out a severing operaton with the apparatus of Figs. 1 and 2, a tube 31 is passed through loops 27—30 with the portion of the tube at which severance is desired located substantially midway between loops 28 and 29. For aid in properly positioning, the tube may have a mark 26 which may comprise an ink line, or may actually be the score line for initiating fracture. The weight W is moved toward the free end of lever 17 a distance determined by experiment sufficient to introduce the circumferential compressive force or load needed to create a suitable axial tension in the portion of the tube between loops 28 and 29. If the tube is scored before placement in the loops, the weight is shifted to build up compressive forces thereunder and the necessary accompanying axial tension in the scored area of the tube to complete the fracture. If line 26 is merely an ink mark or the like, the weight may be adjusted to create a fracture as soon as the tube is scored by knife 33. Alternatively, and preferably, the weight W is first adjusted to place the tube under a compressive load insufficient to cause fracture during scoring, in which case final severance is effected by increasing the compressive load after scoring.

Severance of tube 31 along line 26 is carried out in substantially the same way by use of the apparatus of Figs. 3 and 4 as with the apparatus of Figs. 1 and 2. With the use of the single band 40 arranged in vise 41, the area under maximum axial tension on the inner surface of the tube is located between the lateral margins of the band and accordingly is where the line of severance should be located.

It is possible to carry out applicant's method by creating the desired compressive force or load in the tube using a single loop such as 27 or a single pair of loops such as loops 27 and 28, for example, and scoring the tube along one side thereof. It is also possible to dispense with the use of the second set of loops 27 and 30, using merely loops 28 and 29. For best results, however, applicant prefers to employ loops 27—30 or their equivalent, or a single band such as band 40.

In Fig. 2a the effect of the localized peripheral compressive forces applied by loops 27 to 30 is, for the purpose of illustration, shown greatly exaggerated, and the locations of the resulting circumferential bands of maximum tension are indicated by the letters T. From this view it can at once be seen that when two sets of loops are employed as shown, the most suitable place to effect scoring is on the outer surface of the tube midway between the loops, and that when a single pair of loops such as loops 27 and 28 (equivalent to the single band 40 of Figs. 3 and 4) is employed, the most suitable place to effect scoring is on the inner surface of the tube at a point midway between the lateral confines of the loops.

As has been stated, the desired line of severance should always coincide as nearly as possible with the location along the tubing at which the circumferential band of maximum axial tension is introduced by the compressive equipment irrespective of whether such equipment comprises a single loop or band or a number thereof. This location depends on several factors, such as wall thickness, tube or cylinder diameter, and the distance from the end of the tube or cylinder at which compressive forces are being applied. Also the character of compressive apparatus employed, such as single or multiple loops or bands and their cross-sectional shapes and/or dimension, may affect the location of the area of maximum tension.

As will be understood, the apparatus disclosed for carrying out applicant's methods are for illustrative purposes only, and may be modified or changed within the scope of the appended claims without departing from the spirit or sacrificing any of the advantages of the invention.

What is claimed is:

1. The method of severing a hollow frangible vitreous body of circular cross section, which consists of applying circumferentially around the body adjacent the desired line of severance a uniform compressive force of sufficient magnitude to produce a peripheral band of axial tension with the maximum axial tension around such body substantially on the desired line of severance and scoring the body along only a portion of such line.

2. A method such as defined by claim 1 wherein the scoring step precedes placing the body under the compressive load.

3. A method such as defined by claim 1 wherein the step of placing the body under the compressive load precedes the scoring step.

4. A method such as defined by claim 3, which includes the step of increasing the compressive load after the scoring step.

5. The method of severing a tubular frangible vitreous body of circular cross section, which consists of applying circumferentially around the body adjacent opposite sides of the desired line of severance a uniform compressive force of sufficient magnitude to produce a peripheral band of axial tension with the maximum axial tension around such body substantially on the desired line of severance and scoring the body along only a portion of such line.

6. The method of severing a frangible vitreous tubular body of circular cross section transverse its length, which consists of applying circumferentially around the body adjacent the desired line of severance a uniform compressive force of sufficient magnitude to produce a peripheral band of axial tension with the maximum axial tension around such body substantially along the desired line of severance and scoring the body along only a portion of such line.

7. A severing apparatus consisting of means for scoring a hollow frangible vitreous body of circular cross section along only part of a desired line of severance, and means for applying circumferentially around the body adjacent the desired line of severance a uniform compressive force of sufficient magnitude to produce a peripheral band of axial tension around the body with the maximum axial tension substantially on the desired line of severance.

8. A structure such as defined by claim 7 wherein the force applying means includes a linear member looped about the body and means for placing the linear member under tension.

9. A structure such as defined by claim 7 wherein the force applying means includes a plurality of linear members formed into loops intermediate their ends for receipt of the body to be severed and means for placing said members under tension.

ROBERT B. RANDELS.

REFERENCES CITED

The following references are of record in the file of this patent:

UNITED STATES PATENTS

| Number | Name | Date |
|---|---|---|
| 999,668 | Montaperto | Aug. 1, 1911 |
| 1,892,814 | Stahle | Jan. 3, 1933 |
| 1,922,426 | Fahrney | Aug. 15, 1933 |
| 2,157,067 | Brown et al. | May 2, 1939 |
| 2,174,183 | Shaw | Sept. 26, 1939 |
| 2,219,698 | Owen | Oct. 29, 1940 |